(12) United States Patent
Delfino et al.

(10) Patent No.: US 9,460,558 B2
(45) Date of Patent: Oct. 4, 2016

(54) COMPUTER-IMPLEMENTED METHOD FOR MANIPULATING THREE-DIMENSIONAL MODELED OBJECTS OF AN ASSEMBLY IN A THREE-DIMENSIONAL SCENE

(71) Applicant: Dassault Systemes, Velizy Villacoublay (FR)

(72) Inventors: Christophe Rene Francis Delfino, Saint Laurent du Var (FR); Guillaume Romain Dayde, Grassee (FR); Pierre Coulet, Tanneron (FR)

(73) Assignee: Dassault Systemes, Velizy Villacoublay (FR)

( * ) Notice: Subject to any disclaimer, the term of this patent is extended or adjusted under 35 U.S.C. 154(b) by 164 days.

(21) Appl. No.: 14/249,344

(22) Filed: Apr. 9, 2014

(65) Prior Publication Data
US 2014/0320490 A1   Oct. 30, 2014

(30) Foreign Application Priority Data

Apr. 30, 2013   (EP) .................................... 13165956

(51) Int. Cl.
| | | |
|---|---|---|
| *G06T 17/00* | (2006.01) | |
| *G06T 17/20* | (2006.01) | |
| *G06T 19/20* | (2011.01) | |

(52) U.S. Cl.
CPC .............. *G06T 17/20* (2013.01); *G06T 19/20* (2013.01); *G06T 2210/12* (2013.01); *G06T 2210/62* (2013.01); *G06T 2219/016* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 2005/0270294 A1 | 12/2005 | LeTuan | | |
| 2009/0083669 A1* | 3/2009 | Fitzmaurice | ........ | G06F 3/04815 715/850 |
| 2011/0137892 A1* | 6/2011 | Bisson | .................... | G06F 17/50 707/722 |
| 2012/0075181 A1* | 3/2012 | Algreatly | .............. | G06F 3/0486 345/157 |

OTHER PUBLICATIONS

Li et al. (Automated Generation of Interactive 3D Exploded View Diagrams, vol. 27 Issue 3, Aug. 2008).*
Bruckner et al. (Exploded Views of Volume Data, vol. 12, No. 5, Sep. 2006, IEEE).*
Bruckner et al. (VolumeShop: An Interactive System for Direct vol. Illustration, Oct. 23, 2005, pp. 671-678, IEEE).*

(Continued)

*Primary Examiner* — Kyle Zhai
(74) *Attorney, Agent, or Firm* — Hamilton, Brook, Smith & Reynolds, P.C.

(57) ABSTRACT

A computer-implemented method for manipulating three-dimensional modeled objects of an assembly in a three-dimensional scene, comprising the steps of:
- determining at least a first set of at least one object and a second set of at least one object among said three-dimensional modeled objects of the assembly;
- grouping the at least one object of the first set in a first three-dimensional bounding box (BB) and the at least one object of the second set in a second three-dimensional bounding box (BB); and
- relatively reorganizing the bounding boxes (BB).

25 Claims, 7 Drawing Sheets

(56) References Cited

OTHER PUBLICATIONS

European Search Report for European Application No. EP13165956, Filed on Apr. 30, 2013; Date Report Completed: Dec. 17, 2013.

Xia, Steven et al., "Collaborative Object Grouping in Graphics Editing Systems", Collaborative Computing: Networking, Applications and Worksharing 2005 International Conference on San Jose, CA, Piscataway, New Jersey, USA (Dec. 19, 2005).

\* cited by examiner

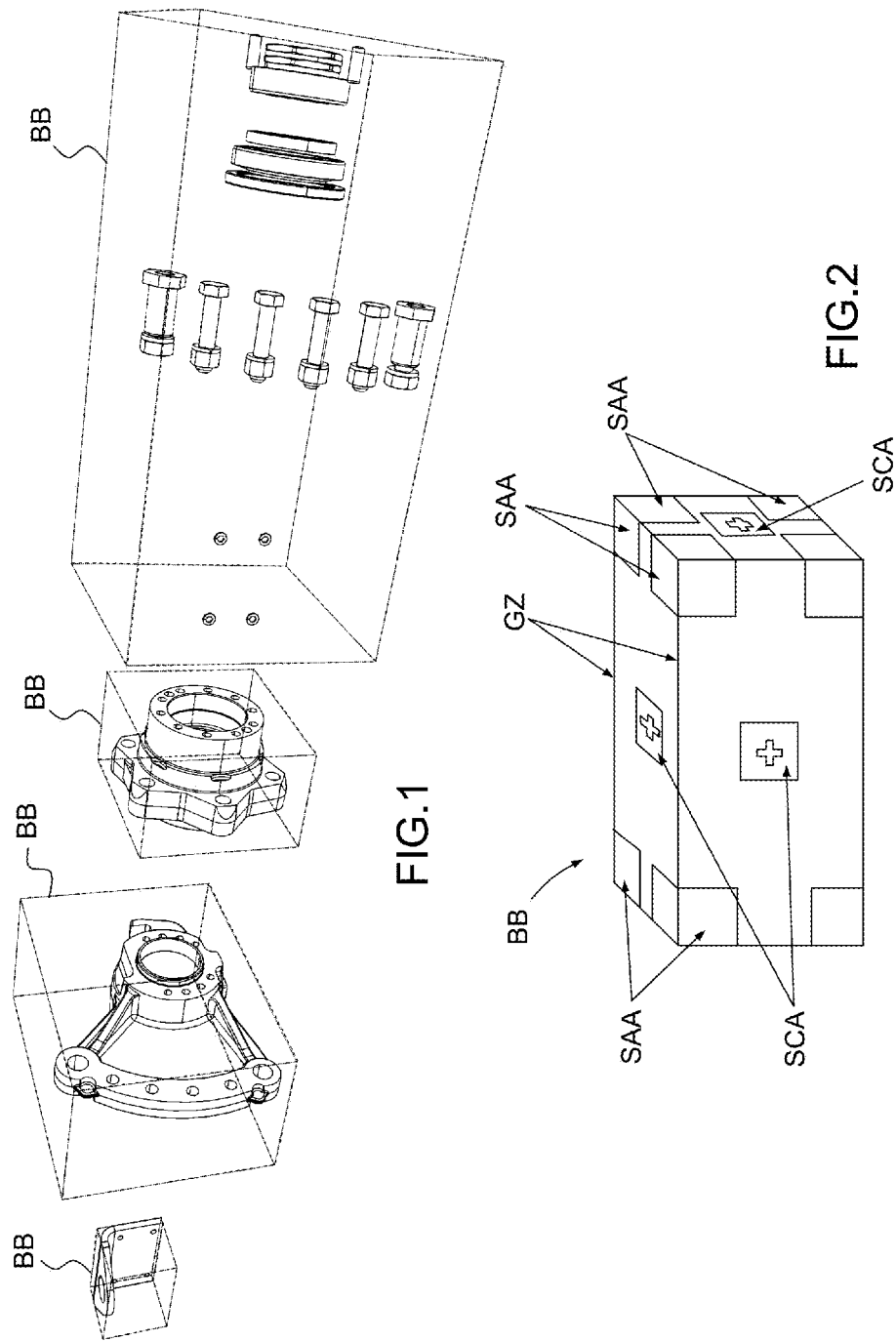

COMPUTER-IMPLEMENTED METHOD FOR MANIPULATING THREE-DIMENSIONAL MODELED OBJECTS OF AN ASSEMBLY IN A THREE-DIMENSIONAL SCENE

RELATED APPLICATION(S)

This application claims priority under 35 U.S.C. §119 or 365 to European Application No. 13165956.7, filed Apr. 30, 2013. The entire teachings of the above application(s) are incorporated herein by reference.

BACKGROUND OF THE INVENTION

The invention relates to the field of computers programs and systems, and more specifically to the field of computer-implemented method for designing and/or authoring technical illustrations, or, in other words for manipulating three-dimensional modeled objects of an assembly in a three-dimensional scene.

A number of systems and programs are offered on the market for designing and/or authoring technical illustrations, such as the one provided by Dassault Systémes under the trademark 3D VIA® Composer.

These systems, mainly dedicated to non-CAD software users, allow a user to produce, for instance, technical illustrations, maintenance or training operations, assembly instructions, marketing presentations, or interactive applications (like interactive parts catalogues . . . ).

In these systems, there exist some advanced tools to create exploded view of a 3D product, but none of them provide solutions for manipulating easily groups of parts or objects of an assembly in a three-dimensional scene.

Indeed, for making an exploded view of a part of an assembly of objects, for example for assembly instructions, during a rearrangement of objects, the mode "exploded view" is exited, and it results in a loss of information and many manipulations to reselect objects and modifying the arrangement. An exploded view represents an assembly of objects spread out according to their relationship, in particular objects positioned to show how they fit together when assembled.

Thus, it is difficult and complex to easily reorganize objects of the exploded view, notably to reorganize a group of objects simultaneously and in a linked manner with other objects of the assembly.

SUMMARY OF THE INVENTION

A goal of the invention is to provide a computer-implemented method and a system to overcome the above mentioned problems.

It is proposed, according to one aspect of the invention, a computer-implemented method for manipulating three-dimensional modeled objects of an assembly in a three-dimensional scene, comprising the steps of:
determining at least a first set of at least one object and a second set of at least one object among said three-dimensional modeled objects of the assembly;
grouping the at least one object of the first set in a first three-dimensional bounding box and the at least one object of the second set in a second three-dimensional bounding box; and
relatively reorganizing the bounding boxes.

Such a method allows to easily and quickly modify an exploded view, with very few manipulations. Moreover, the method allows a good space and alignment management between different groups of objects of an exploded view.

Moreover, the user has no need to work with a high granularity of part selection, with one single action, he can position a whole set of parts.

Groups of objects can be positioned and re-ordered with an exact same spacing with a minimum effort.

Alternatively, such a method can be used for simulations of supermarket racks, for example for marketing tests.

According to an embodiment, the step of reorganizing the bounding boxes comprises a changing of the content of the set of objects of the bounding boxes.

Thus it is easier to modify an exploded view of a part of an assembly.

According to an embodiment, said changing of the content of the set of objects of a bounding box uses at least one selectable content area of the surface of the bounding box.

This is an easy manner to change the content of the set of objects of a bounding box.

Objects can be easily extracted from a group (bounding box or linked bounding boxes) and attached to another, using the interactive command of the box. Thus, the added objects naturally follow the motion of its new group.

According to an embodiment, the step of reorganizing the bounding boxes comprises a changing of the relative position of the bounding boxes.

According to an embodiment, said changing of the relative position of the bounding boxes uses at least one selectable axial area of the surface of a bounding box to change the position of another bounding box along an axis orthogonal to said axial part.

The user can use the position of other groups to align the group of objects he is working with. This makes the alignment significantly easier and faster.

According to an embodiment, the second three-dimensional bounding box is created from the extraction of at least one object of the first three-dimensional bounding box.

Thus, it is possible to create an exploded view from only one bounding box.

According to an embodiment, a bounding box is manually created, or automatically created from values of parameters.

According to an embodiment, a bounding box is grabbed by at least a grabbed zone.

Thus, a modification of the exploded view is easy.

According to an embodiment, the step of reorganizing the bounding boxes comprises a linking in movement of a plurality of bounding boxes.

Thus, a modification of the exploded view is easy.

According to an embodiment, a selectable area is partially transparent or semi-transparent.

Thus it is easy to use the controls, while maintaining the visibility of the assembly.

It is proposed, according to another aspect of the invention, a computer-readable medium having computer-executable instructions to cause the computer system to perform the method for manipulating three-dimensional modeled objects of an assembly in a three-dimensional scene as described above.

It is proposed, according to another aspect of the invention, computer program product, stored on a computer readable medium, for manipulating three-dimensional modeled objects of an assembly in a three-dimensional scene, comprising code means for causing the system to take the steps of the method as described above.

It is proposed, according to another aspect of the invention, an apparatus for manipulating three-dimensional modeled objects of an assembly in a three-dimensional scene comprising means for implementing the steps of the method as described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention will be better understood with the study of some embodiments described by way of non-limiting examples and illustrated by the accompanying drawings wherein:

FIG. 1 illustrates an example of defining sets of objects of an assembly according to an aspect of the invention;

FIG. 2 illustrates an example of bounding box, according to an aspect of the invention;

DETAILED DESCRIPTION OF THE INVENTION

A description of example embodiments of the invention follows.

The teachings of all patents, published applications and references cited herein are incorporated by reference in their entirety.

Following figures explain more in details the functioning of the present invention.

On FIG. 1 is illustrated an example of defining sets of objects of an assembly according to an aspect of the invention.

The user begins to determine at least a first set of at least one object and a second set of at least one object among said three-dimensional modeled objects of the assembly, and to group the at least one object of the first set in a first three-dimensional bounding box and the at least one object of the second set in a second three-dimensional bounding box.

On FIG. 1 is illustrated an example with four bounding boxes BB, each comprising a set of at last one object.

On FIG. 2 is illustrated an example of a bounding box BB, wherein different controls are available with the interactive bounding box. A control is a command which allows a user to interact with the bounding box BB and trigger a predetermined functionality.

A bounding box BB comprises at least one selectable content area SCA of the surface of the bounding box BB. For example, for a parallelepiped bounding box BB, the faces of the bounding box BB can comprise a part which is a control to add objects of the assembly to the bounding box BB, for example in the center of the faces.

A bounding box BB can further comprise at least one selectable axial area SAA of its surface to change the position of another bounding box BB along an axis orthogonal to said axial area SAA. For example, for a parallelepiped bounding box BB, the faces of the bounding box BB can comprise a part which is a control, for example in each corner of the faces, to change the position of another bounding box BB along an axis orthogonal to said axial part.

A bounding box BB can further comprise grab zones GZ or in other words grab areas, for example located around the edges of the bounding box BB.

The controls SCA, SAA of the bounding box BB can be displayed in a partial transparency, for example in a semi-transparency.

Figure 3A:
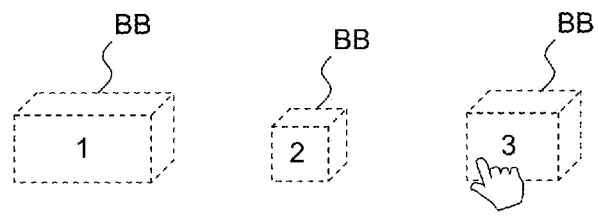
FIGS. 3a, 3b, and 3c illustrate an example of reordering three bounding boxes, according to an aspect of the invention.
Figure 3B:
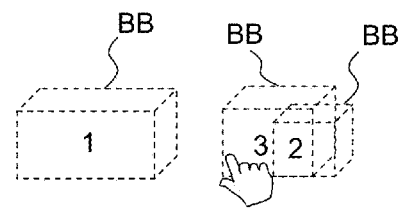
Figure 3C:
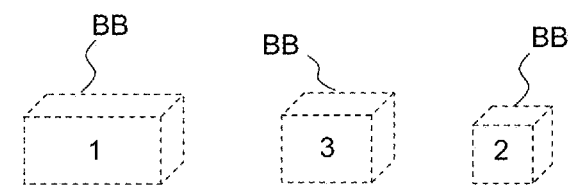

On FIGS. 3a, 3b and 3c is represented an example of reordering three bounding boxes numbered 1, 2 and 3. On FIG. 3a, the three boxes 1, 2 and 3 are aligned in this order. The user selects the bounding box 3 with a grab zone.

On FIG. 3b, the user drags the bounding box 3 to change its relative position, and drops the bounding box 3 between the bounding boxes 1 and 2. Thus, as illustrated on FIG. 3c, the relative position of the three bounding boxes has been changed, and the bounding box 3 is between the bounding boxes 1 and 2. As illustrated, the distance between the sets of objects can be preserved.

Figure 4A:
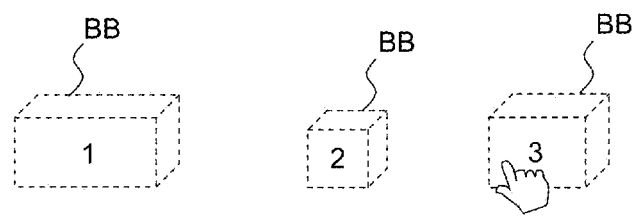
FIGS. 4a, 4b, and 4c illustrate an example of reordering three bounding boxes, according to an aspect of the invention.
Figure 4B:
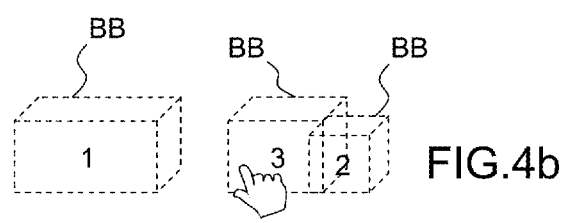
Figure 4C:
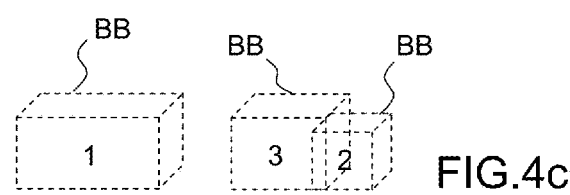

On FIGS. 4a, 4b and 4c is represented an example of reordering three bounding boxes numbered 1, 2 and 3. This manipulation is similar to the simulation illustrated on FIGS. 3a, 3b and 3c, but comprises an additional option, for example the user presses a key like the "Alt" key, and then, as represented on FIG. 4c, the bounding box 3 is freely moved by the user, without preservation of distances between the bounding boxes.

Figure 5A:
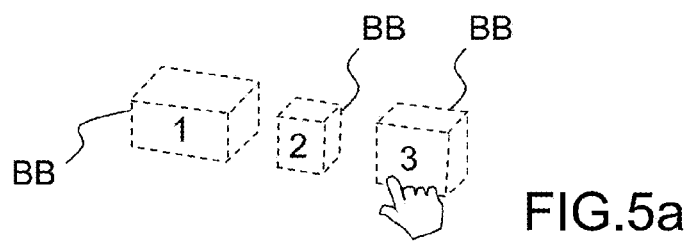
FIGS. 5a, 5b and 5c illustrate an example of reordering three bounding boxes, with changing the axial position of a bounding box, according to an aspect of the invention.
Figure 5B:
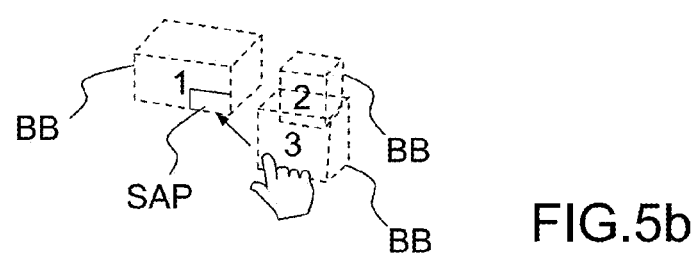
Figure 5C:
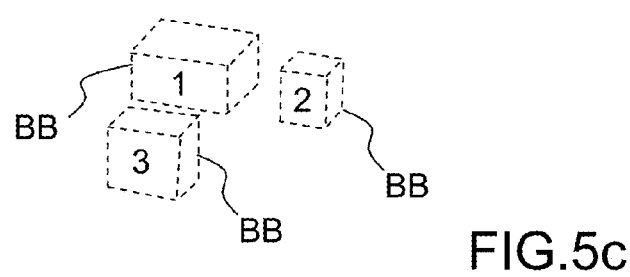

On FIGS. 5a, 5b et 5C, is represented an example of reordering three bounding boxes numbered 1, 2 and 3, with changing the axial position of the bounding box 3 relative to the bounding box 1. At the beginning of the manipulation, the three bounding boxes are aligned, as represented on FIG. 5a. Then the user grabs the box 3 and drags it over a plane control or selectable axial area SAA, as represented on FIG. 5b, and then the bounding box 3 is ahead the bounding box 1.

It should also be possible to click on a grab zone GZ of one box then click on a selectable axial area SAA of another box to make the alignment.

Figure 6A:
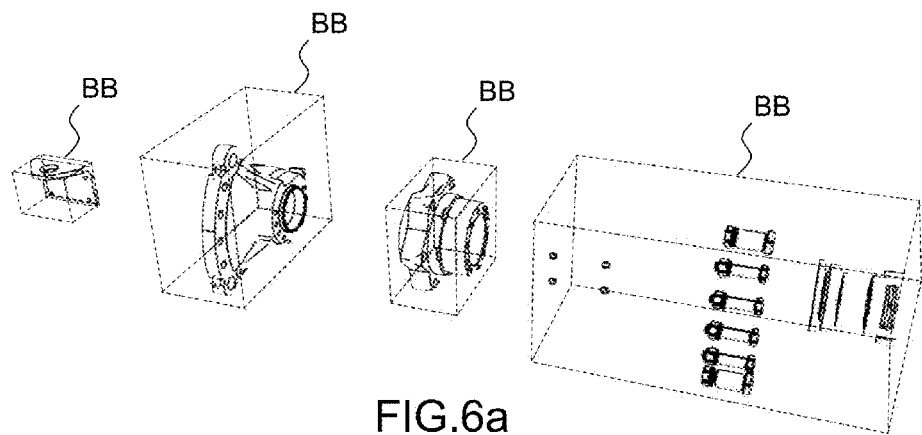
FIGS. 6a, 6b and 6c illustrate an example of reordering of objects or parts of a truck nosewheel, according to an aspect of the invention.
Figure 6B:
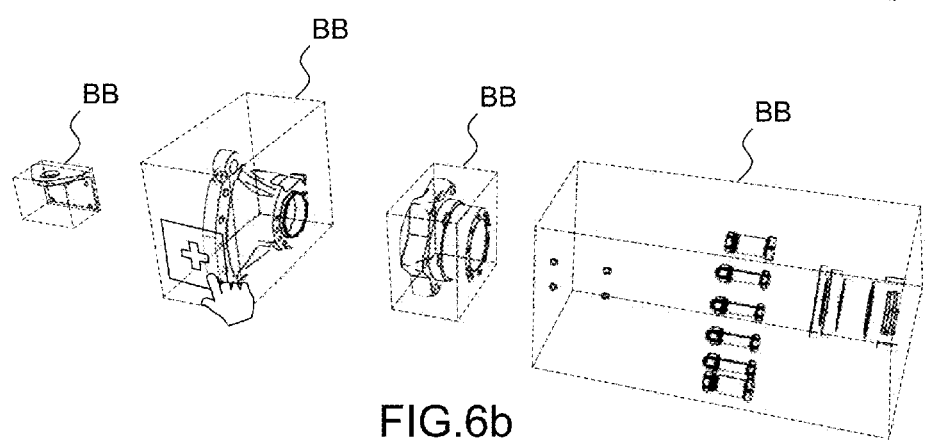
Figure 6C:
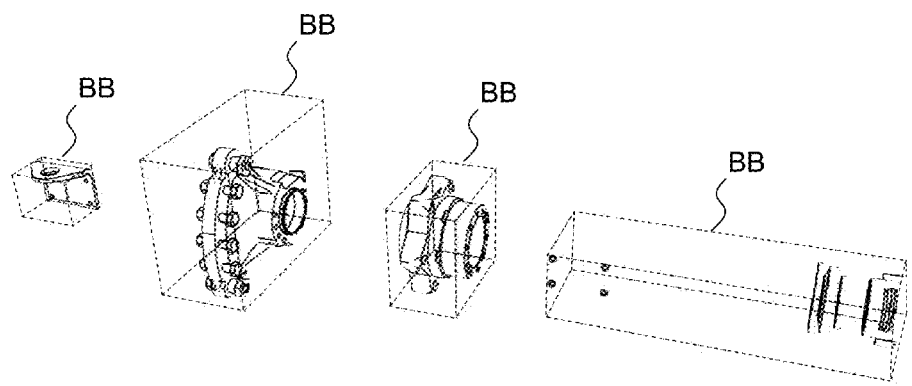

FIGS. 6a, 6b and 6c illustrate an example of reordering of objects or parts of a truck nosewheel wherein the user can select parts or objects inside a box, in the present case six mechanical parts or objects and then click on the selectable content part CPS control, for example represented by a partly or semi transparent "+" of another box to add the objects to it. Alternatively, it is also possible for the user to select objects inside a box and create a new bounding box aligned containing these selected objects.

Figure 7A:
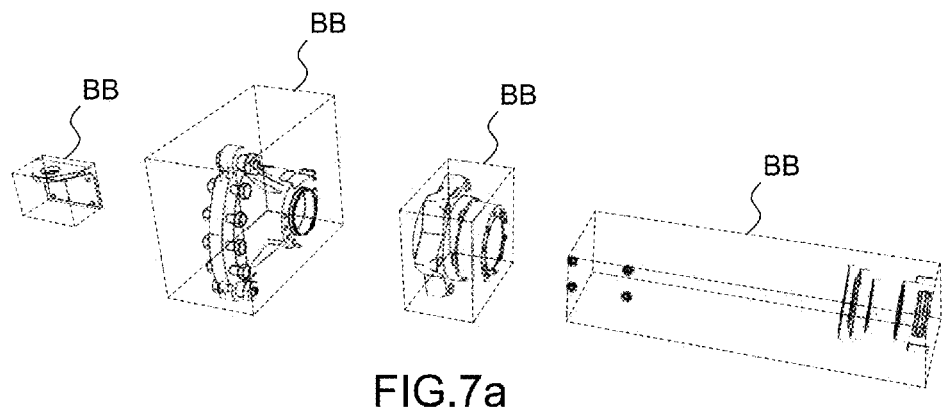
FIGS. 7a, 7b and 7c illustrate another example of reordering of objects or parts of a truck nosewheel, according to an aspect of the invention.
Figure 7B:
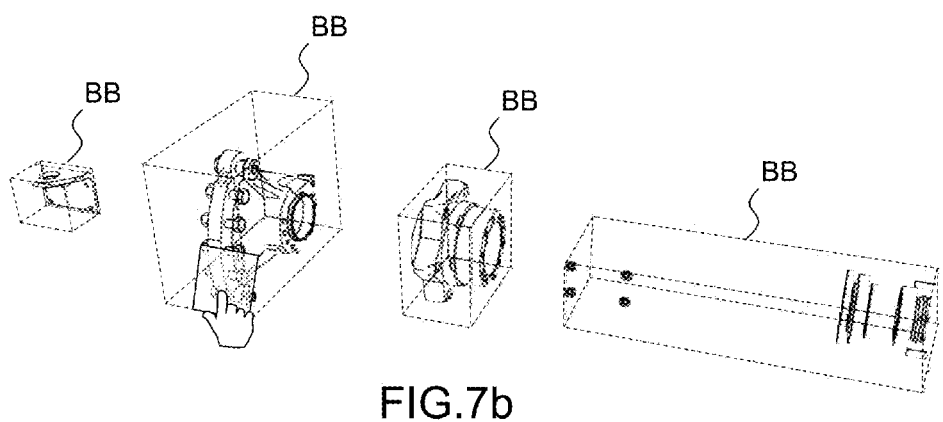
Figure 7C:
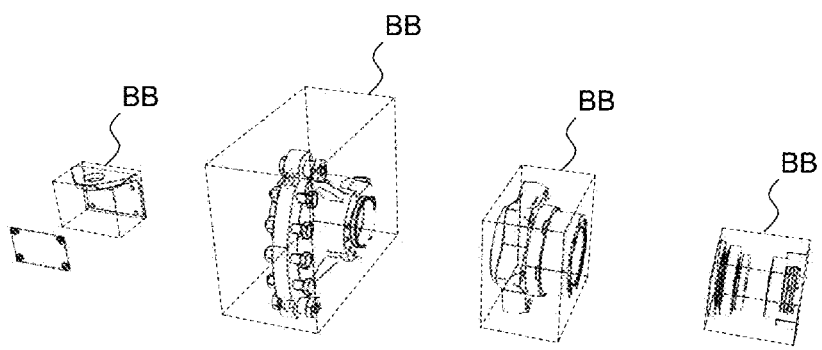

FIGS. 7a, 7b and 7c illustrate an example of reordering of objects or parts of a truck nosewheel wherein the user can select objects inside a box, in the present case four mechanical parts or objects and then click on the control plane of another box to extract and align the selected objects creating a new set of objects in a bounding box.

The selected objects can also be a set of objects outside of a bounding box.

Figure 8:
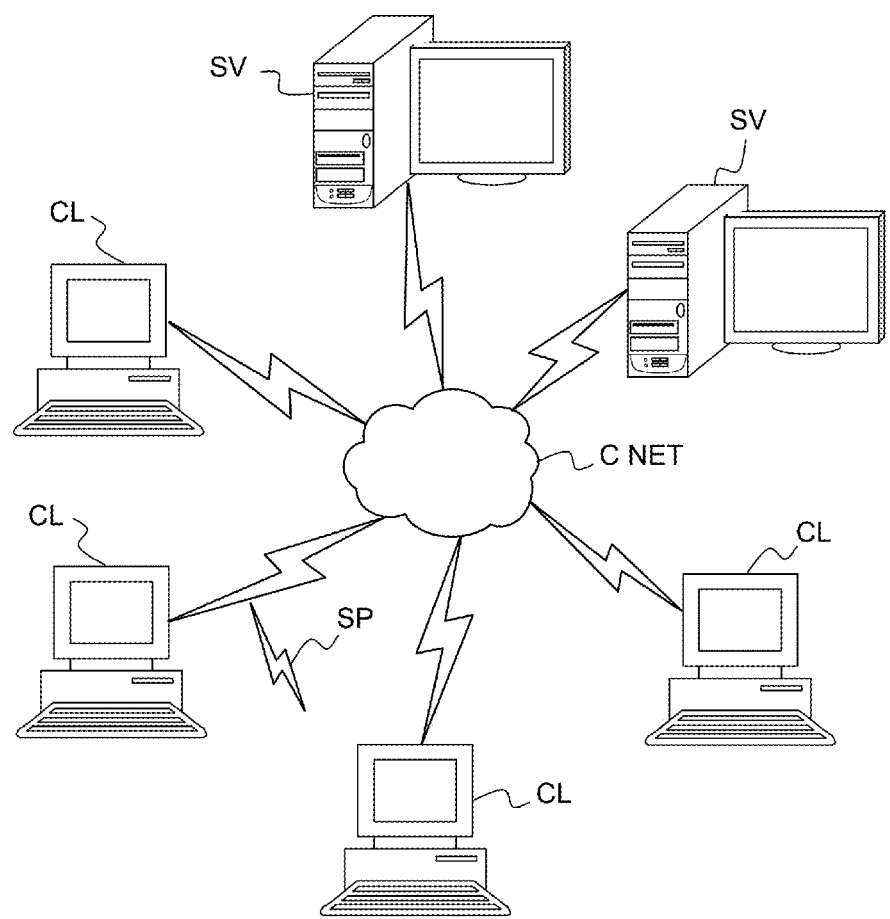
FIG. 8 illustrates a computer network or similar digital processing environment in which the present invention may be implemented.

FIG. 8 illustrates a computer network or similar digital processing environment in which the present invention may be implemented.

Client computer(s)/devices CL and server computer(s) SV provide processing, storage, and input/output devices executing application programs and the like. Client computer(s)/devices CL can also be linked through communications network CNET to other computing devices, including other client devices/processes CL and server computer(s) SV. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 9:
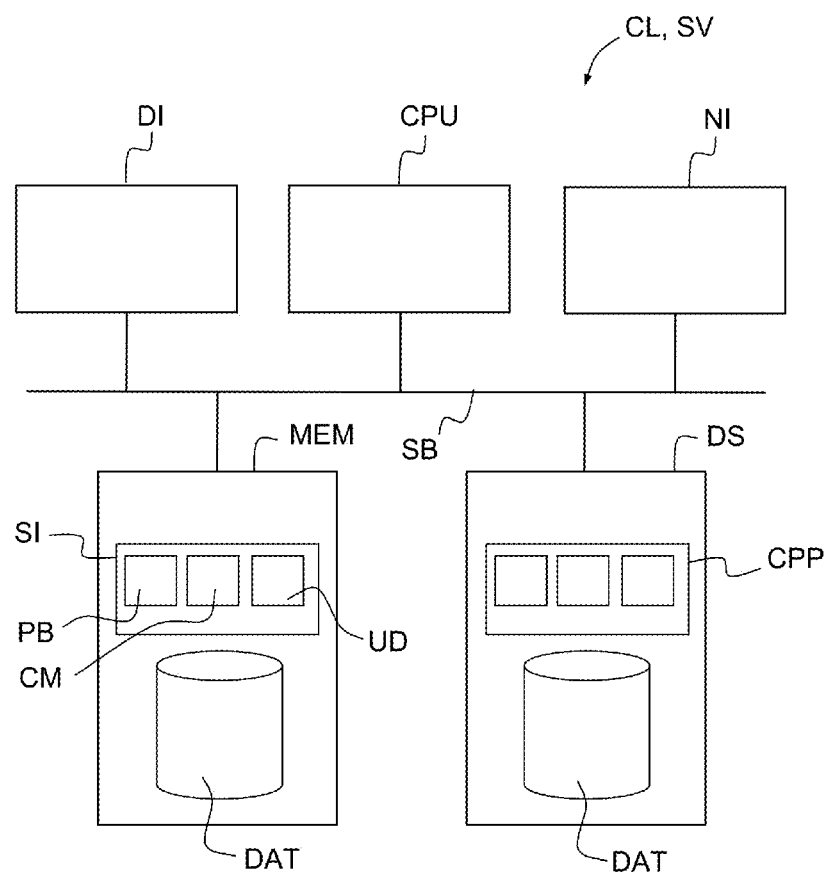
FIG. 9 illustrates a diagram of the internal structure of a computer.

FIG. 9 is a diagram of the internal structure of a computer (e.g., client processor/device CL or server computers SV) in the computer system of FIG. 8. Each computer CL, SV contains system bus SB, where a bus is a set of hardware lines used for data transfer among the components of a computer or processing system. Bus SB is essentially a shared conduit that connects different elements of a computer system (e.g., processor, disk storage, memory, input/output ports, network ports, etc. . . . ) that enables the transfer of information between the elements.

Attached to system bus SB is I/O device interface DI for connecting various input and output devices (e.g., keyboard, mouse, displays, printers, speakers, etc.) to the computer CL, SV. Network interface NI allows the computer to connect to various other devices attached to a network (e.g., network CNET of FIG. 8).

Memory MEM provides volatile storage for computer software instructions SI and data CPP used to implement an embodiment of the present invention (e.g., a first path builder PB, means CM for computing a second path, an updater UD implementing the method discussed in FIGS. 1 to 7c, and supporting code detailed above).

Disk storage DS provides non-volatile storage for computer software instructions SI and data DAT used to implement an embodiment of the present invention. Central processor unit CPU is also attached to system bus SB and provides for the execution of computer instructions.

In one embodiment, the processor routines SI and data DAT are a computer program product (generally referenced CPP), including a computer readable medium (e.g., a removable storage medium such as one or more DVD-ROM's, CD-ROM's, diskettes, tapes, etc. . . . ) that provides at least a portion of the software instructions for the invention system. Computer program product CPP can be installed by any suitable software installation procedure, as is well known in the art.

In another embodiment, at least a portion of the software instructions may also be downloaded over a cable, communication and/or wireless connection. In other embodiments, the invention programs are a computer program propagated signal product SP embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program CPP.

In alternate embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer.

In another embodiment, the computer readable medium of computer program product CPP is a propagation medium that the computer system CL may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for manipulating three-dimensional modeled objects of an assembly in a three-dimensional scene, comprising the steps of:
   determining at least a first set of at least one object and a second set of at least one object among said three-dimensional modeled objects of the assembly;
   grouping the at least one object of the first set in a first three-dimensional bounding box (BB) and the at least one object of the second set in a second three-dimensional bounding box (BB), wherein each bounding box is a volume within the three-dimensional scene defining a space enveloping at least one of the three-dimensional modeled objects of the assembly without being such an object itself; and
   relatively reorganizing the first three-dimensional bounding box (BB) and the second three-dimensional bounding box (BB), resulting in a relative reorganization of at least one of the three-dimensional modeled objects of the assembly;
   wherein the step of relatively reorganizing the bounding boxes (BB) comprises a changing of content of at least one bounding box (BB) by:
      selecting a given object of the three-dimensional modeled objects of the assembly,
      acting on a control of the at least one bounding box (BB), the control being a selectable content area (SCA) located on the surface of the at least one bounding box (BB), and
      as a result of said acting on the control, adding the selected given object to the at least one bounding box (BB), or withdrawing the selected given object from the at least one bounding box (BB).

2. Computer-implemented method according to claim 1, wherein the step of reorganizing the bounding boxes (BB) comprises a changing of the relative position of the bounding boxes (BB).

3. Computer-implemented method according to claim 1, wherein the second three-dimensional bounding box (BB) is created from an extraction of at least one object of the first three-dimensional bounding box (BB).

4. Computer-implemented method according to claim 1, wherein a bounding box (BB) is manually created, or automatically created from values of parameters.

5. Computer-implemented method according to claim 1, wherein the step of reorganizing the bounding boxes (BB) comprises a linking in movement of a plurality of bounding boxes (BB).

6. Computer-implemented method according to claim 1, wherein said selectable content area (SCA) is partially transparent or semi-transparent.

7. A non-transitory computer-readable medium comprising:
   non-transitory computer storage; and
   computer-executable instructions embodied on the computer storage in a manner that causes a computer system to manipulate three-dimensional modeled objects of an assembly in a three-dimensional scene, by:
      determining at least a first set of at least one object and a second set of at least one object among said three-dimensional modeled objects of the assembly;
      grouping the at least one object of the first set in a first three-dimensional bounding box (BB) and the at least one object of the second set in a second three-dimensional bounding box (BB), said first and second three-dimensional bounding boxes being distinct from the three-dimensional modeled objects of the assembly; and
      relatively reorganizing the first three-dimensional bounding box (BB) and the second three-dimensional bounding box (BB), resulting in a relative reorganization of at least one of the three-dimensional modeled objects of the assembly, wherein said relatively reorganizing the bounding boxes (BB) comprises a changing of content of at least one bounding box (BB) by:
         selecting a given object of the three-dimensional modeled objects of the assembly,
         acting on a control of the at least one bounding box (BB), the control being a selectable content area (SCA) located on the surface of the at least one bounding box (BB), and
         as a result of said acting on the control, adding the selected given object to the at least one bounding box (BB), or withdrawing the selected given object from the at least one bounding box (BB).

8. A computer program product comprising:
   a non-transitory computer readable medium, for manipulating three-dimensional modeled objects of an assembly in a three-dimensional scene; and
   a code means stored on the non-transitory computer readable medium and causing a computer system to:
      determine at least a first set of at least one object and a second set of at least one object among said three-dimensional modeled objects of the assembly;
      group the at least one object of the first set in a first three-dimensional bounding box (BB) and the at least one object of the second set in a second three-dimensional bounding box (BB), said first and second three-dimensional bounding boxes being distinct from the three-dimensional modeled objects of the assembly; and
      relatively reorganize the first three-dimensional bounding box (BB) and the second three-dimensional bounding box (BB), resulting in a relative reorganization of at least one of the three-dimensional modeled objects of the assembly;
      wherein causing the computer system to relatively reorganize the bounding boxes (BB) comprises a changing of content of at least one bounding box (BB) by:
         selecting a given object of the three-dimensional modeled objects of the assembly,
         acting on a control of the at least one bounding box (BB), the control being a selectable content area (SCA) located on the surface of the at least one bounding box (BB), and
         as a result of said acting on the control, adding the selected given object to the at least one bounding box (BB), or withdrawing the selected given object from the at least one bounding box (BB).

9. Computer apparatus for manipulating three-dimensional modeled objects of an assembly in a three-dimensional scene comprising:
   a processor configured to:
      determine at least a first set of at least one object and a second set of at least one object among said three-dimensional modeled objects of the assembly;
      group the at least one object of the first set in a first three-dimensional bounding box (BB) and the at least one object of the second set in a second three-dimensional bounding box (BB), said first and second three-dimensional bounding boxes being distinct from the three-dimensional modeled objects of the assembly; and
      relatively reorganize the first three-dimensional bounding box (BB) and the second three-dimensional bounding box (BB), resulting in a relative reorganization of at least one of the three-dimensional modeled objects of the assembly, wherein to relatively reorganize the bounding boxes (BB) comprises a changing of content of at least one bounding box (BB) by:
         selecting a given object of the three-dimensional modeled objects of the assembly,
         acting on a control of the at least one bounding box (BB), the control being a selectable content area (SCA) located on the surface of the at least one bounding box (BB), and
         as a result of said acting on the control, adding the selected given object to the at least one bounding box (BB), or withdrawing the selected given object from the at least one bounding box (BB).

10. Computer apparatus as claimed in claim 9 wherein the processor is further configured to change relative position of the bounding boxes (BB).

11. Computer apparatus as claimed in claim 9 wherein the second three-dimensional bounding box (BB) is created from an extraction of at least one object of the first three-dimensional bounding box (BB).

12. Computer apparatus as claimed in claim 9 wherein a bounding box (BB) is manually created, or automatically created from values of parameters.

13. Computer apparatus as claimed in claim 9 wherein a bounding box (BB) is changed by grabbing the bounding box (BB) by at least a grab zone (GZ).

14. Computer apparatus as claimed in claim 9 wherein the processor is further configured to link in movement a plurality of bounding boxes (BB).

15. Computer apparatus as claimed in claim 9 wherein the selectable content area (SCA) is partially transparent or semi-transparent.

16. A computer-implemented method for manipulating three-dimensional modeled objects of an assembly in a three-dimensional scene, comprising the steps of:
  determining at least a first set of at least one object and a second set of at least one object among said three-dimensional modeled objects of the assembly;
  grouping the at least one object of the first set in a first three-dimensional bounding box (BB) and the at least one object of the second set in a second three-dimensional bounding box (BB), wherein each bounding box is a volume within the three-dimensional scene defining a space enveloping at least one of the three-dimensional modeled objects of the assembly without being such an object itself; and
  relatively reorganizing the first three-dimensional bounding box (BB) and the second three-dimensional bounding box (BB), resulting in a relative reorganization of at least one of the three-dimensional modeled objects of the assembly;
  wherein the step of relatively reorganizing the bounding boxes (BB) comprises:
    acting on a control of the first three-dimensional bounding box (BB), the control being a selectable axial area (SAA) located on the surface of the first three-dimensional bounding box (BB),
    selecting the second three-dimensional bounding box (BB), and
    as a result of said acting on the control and said selecting, translating the second three-dimensional bounding box (BB) along an axis orthogonal to said axial (SAA) of the first three-dimensional bounding box (BB).

17. Computer-implemented method according to claim 16, wherein said translating the second three-dimensional bounding box (BB) comprises grabbing the second three-dimensional bounding box (BB) by at least a grab zone (GZ).

18. Computer-implemented method according to claim 16, wherein the second three-dimensional bounding box (BB) is created from an extraction of at least one object of the first three-dimensional bounding box (BB).

19. Computer-implemented method according to claim 16, wherein a bounding box (BB) is manually created, or automatically created from values of parameters.

20. Computer-implemented method according to claim 16, wherein the step of relatively reorganizing the bounding boxes (BB) further comprises a linking in movement of a plurality of bounding boxes (BB).

21. Computer-implemented method according to claim 16, wherein said selectable axial area (SAA) is partially transparent or semi-transparent.

22. A non-transitory computer-readable medium comprising:
  non-transitory computer storage; and
  computer-executable instructions embodied on the computer storage in a manner that causes a computer system to manipulate three-dimensional modeled objects of an assembly in a three-dimensional scene, by:
    determining at least a first set of at least one object and a second set of at least one object among said three-dimensional modeled objects of the assembly;
    grouping the at least one object of the first set in a first three-dimensional bounding box (BB) and the at least one object of the second set in a second three-dimensional bounding box (BB), said first and second three-dimensional bounding boxes being distinct from the three-dimensional modeled objects of the assembly; and
    relatively reorganizing the first three-dimensional bounding box (BB) and the second three-dimensional bounding box (BB), resulting in a relative reorganization of at least one of the three-dimensional modeled objects of the assembly, wherein said relatively reorganizing the bounding boxes (BB) comprises:
      acting on a control of the first three-dimensional bounding box (BB), the control being a selectable axial area (SAA) located on the surface of the first three-dimensional bounding box (BB),
      selecting the second three-dimensional bounding box (BB), and
      as a result of said acting on the control and said selecting, translating the second three-dimensional bounding box (BB) along an axis orthogonal to said axial (SAA) of the first three-dimensional bounding box (BB).

23. A computer program product comprising:
  a non-transitory computer readable medium, for manipulating three-dimensional modeled objects of an assembly in a three-dimensional scene; and
  a code means stored on the non-transitory computer readable medium and causing a computer system to:
    determine at least a first set of at least one object and a second set of at least one object among said three-dimensional modeled objects of the assembly;
    group the at least one object of the first set in a first three-dimensional bounding box (BB) and the at least one object of the second set in a second three-dimensional bounding box (BB), said first and second three-dimensional bounding boxes being distinct from the three-dimensional modeled objects of the assembly; and
    relatively reorganize the first three-dimensional bounding box (BB) and the second three-dimensional bounding box (BB), resulting in a relative reorganization of at least one of the three-dimensional modeled objects of the assembly;
  wherein causing the computer system to relatively reorganize the bounding boxes (BB) comprises:
    acting on a control of the first three-dimensional bounding box (BB), the control being a selectable axial area (SAA) located on the surface of the first three-dimensional bounding box (BB),
    selecting the second three-dimensional bounding box (BB), and as a result of said acting on the control and said selecting, translating the second three-dimensional bounding box (BB) along an axis orthogonal to said axial (SAA) of the first three-dimensional bounding box (BB).

24. Computer apparatus for manipulating three-dimensional modeled objects of an assembly in a three-dimensional scene comprising:
  a processor configured to:
    determine at least a first set of at least one object and a second set of at least one object among said three-dimensional modeled objects of the assembly;
    group the at least one object of the first set in a first three-dimensional bounding box (BB) and the at least one object of the second set in a second three-dimensional bounding box (BB), said first and second three-dimensional bounding boxes being distinct from the three-dimensional modeled objects of the assembly; and relatively reorganize the first three-dimensional bounding box (BB) and the second three-dimensional bounding box (BB), resulting in a relative reorganization of at least one of the three-dimensional modeled objects of the assembly, wherein to relatively reorganize the bounding boxes (BB) comprises:

acting on a control of the first three-dimensional bounding box (BB), the control being a selectable axial area (SAA) located on the surface of the first three-dimensional bounding box (BB), selecting the second three-dimensional bounding box (BB), and as a result of said acting on the control and said selecting, translating the second three-dimensional bounding box (BB) along an axis orthogonal to said axial (SAA) of the first three-dimensional bounding box (BB).

25. Computer apparatus as claimed in claim 24 wherein the selectable axial area (SAA) is partially transparent or semi-transparent.

\* \* \* \* \*